US012761926B2

(12) United States Patent
Sayyed et al.

(10) Patent No.: US 12,761,926 B2
(45) Date of Patent: Oct. 13, 2026

(54) EFFICIENT HANDLING OF EMBEDDED CONTROLLER I/O

(71) Applicant: Dell Products L.P., Round Rock, TX (US)

(72) Inventors: Ibrahim Sayyed, Georgetown, TX (US); Anand Prakash Joshi, Round Rock, TX (US); Michael A. Phillips, El Paso, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/651,264

(22) Filed: Apr. 30, 2024

(65) Prior Publication Data

US 2025/0335205 A1 Oct. 30, 2025

(51) Int. Cl.
*G06F 9/4401* (2018.01)

(52) U.S. Cl.
CPC .................................. *G06F 9/4406* (2013.01)

(58) Field of Classification Search
None
See application file for complete search history.

(56) References Cited

U.S. PATENT DOCUMENTS

2003/0163620 A1* 8/2003 Minami ................ G06F 3/0679 710/62
2010/0312930 A1* 12/2010 Yamagata ........... G06F 13/4045 710/105
2015/0169477 A1* 6/2015 Beel .................... H04L 12/1822 710/10
2015/0185808 A1* 7/2015 Gough .................. G06F 1/3293 713/320
2016/0202742 A1* 7/2016 He ........................ G06F 1/1626 713/2
2018/0225126 A1* 8/2018 Liu ..................... G06F 11/3013
2025/0199817 A1* 6/2025 Wang .................... G06F 13/102

* cited by examiner

*Primary Examiner* — Fahmida Rahman
(74) *Attorney, Agent, or Firm* — Jackson Walker L.L.P.

(57) ABSTRACT

An information handling system may include at least one central processing unit (CPU); a Basic Input/Output System (BIOS); and an embedded controller (EC). The information handling system may be configured to: execute an operating system (OS) via the at least one CPU; execute an OS device driver for the EC, wherein the OS device driver is configured to provide non-blocking input/output (I/O) operations on the EC without the execution of a system management interrupt (SMI); and allow access to the EC from an application program via the device driver.

16 Claims, 3 Drawing Sheets

EFFICIENT HANDLING OF EMBEDDED CONTROLLER I/O

TECHNICAL FIELD

The present disclosure relates in general to information handling systems, and more particularly to management of input/output relating to an embedded controller of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often include an embedded controller (EC) for carrying out various low-level tasks (e.g., keyboard processing, power management, lighting controls, etc.). In existing implementations, communication between the EC and the operating system of the host information handling system generally takes place via a system management interrupt (SMI).

However, an SMI is a global interrupt that forces all other tasks on all processor cores to stop executing. The use of such an aggressive interrupt for EC input/output (I/O) can cause various issues, especially for any timing-sensitive tasks. For example, if the SMI takes more than a few milliseconds to complete, it can cause glitches in video or audio playback, etc.

Accordingly, embodiments of this disclosure provide a more efficient technique for performing I/O between the host OS and the EC of an information handling system.

It should be noted that some terms discussed herein are described in the Advanced Configuration and Power Interface (ACPI) Specification version 6.5, which was released in August 2022 (hereinafter, ACPI Specification), which is hereby incorporated by reference in its entirety. One of ordinary skill in the art with the benefit of this disclosure will understand its applicability to other specifications (e.g., prior or successor versions of the ACPI Specification). Further, some embodiments may be applicable to different technologies other than ACPI.

It should be noted that the discussion of a technique in the Background section of this disclosure does not constitute an admission of f prior-art status. No such admissions are made herein, unless clearly and unambiguously identified as such.

SUMMARY

In accordance with the teachings of the present disclosure, the disadvantages and problems associated with embedded controller I/O may be reduced or eliminated.

In accordance with embodiments of the present disclosure, an information handling system may include at least one central unit processing (CPU); a Basic Input/Output System (BIOS); and an embedded controller (EC). The information system may be configured to: execute an operating system (OS) via the at least one CPU; execute an OS device driver for the EC, wherein the OS device driver is configured to provide non-blocking input/output (I/O) operations on the EC without the execution of a system management interrupt (SMI); and allow access to the EC from an application program via the device driver.

In accordance with these and other embodiments of the present disclosure, a method may include an information handling system executing an operating system (OS) via a central processing unit (CPU) thereof; the information handling system executing an OS device driver for an embedded controller (EC) thereof, wherein the OS device driver provides non-blocking input/output (I/O) operations on the EC without the execution of a system management interrupt (SMI); and the information handling system allowing access to the EC from an application program via the device driver.

In accordance with these and other embodiments of the present disclosure, an article of manufacture may include a non-transitory, computer-readable medium having computer-executable instructions thereon that are executable by a processor of an information handling system for: executing an operating system (OS); executing an OS device driver for an embedded controller (EC) of the information handling system, wherein the OS device driver is configured to provide non-blocking input/output (I/O) operations on the EC without the execution of a system management interrupt (SMI); and allowing access to the EC from an application program via the device driver.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
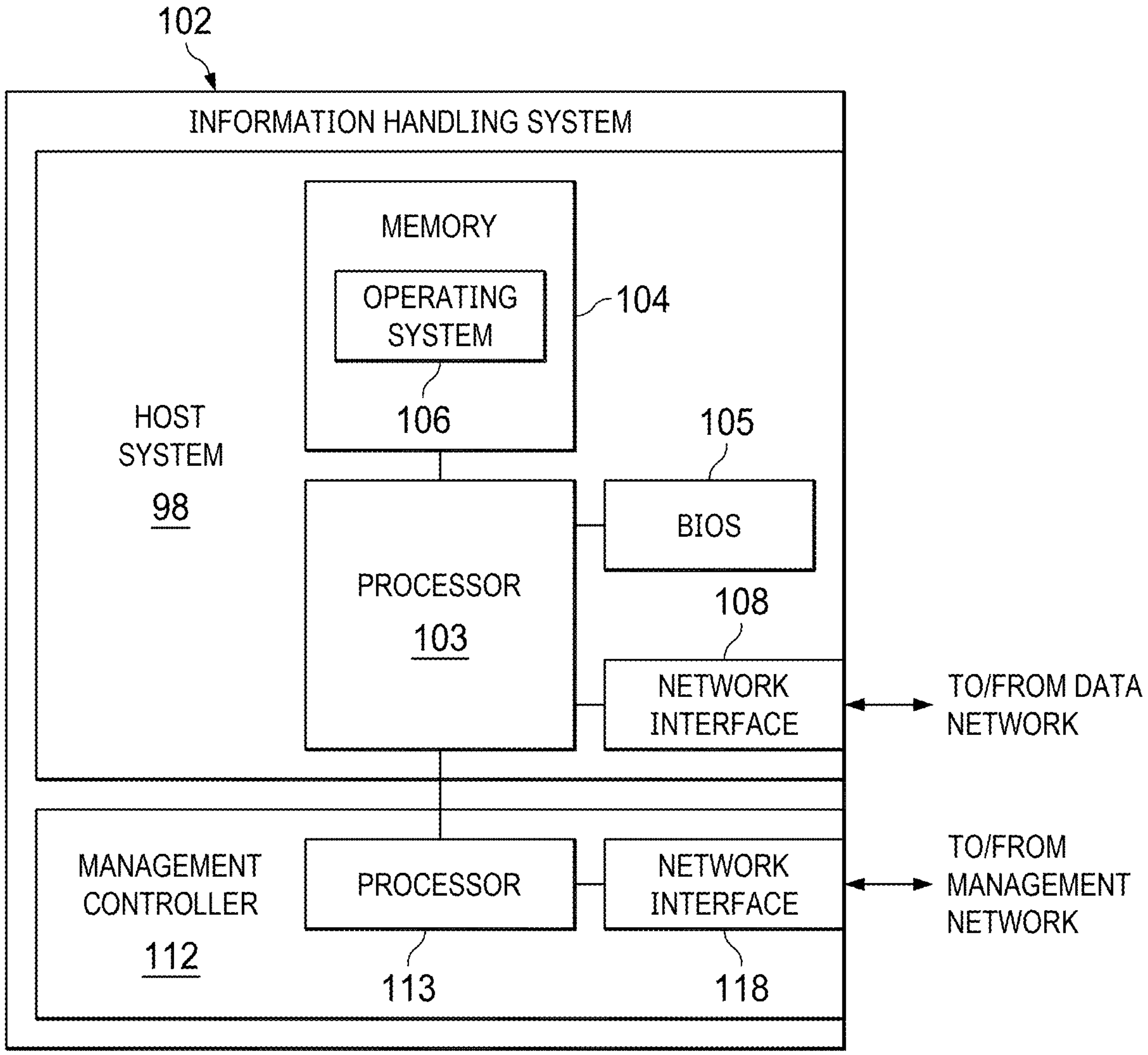
FIG. 1 illustrates a block diagram of an example information handling system, in accordance with embodiments of the present disclosure.
Figure 2A:
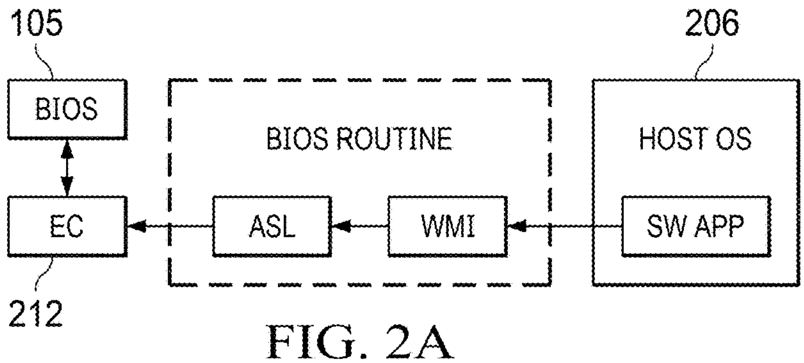
FIGS. 2A and 2B illustrate communications between a software application and an embedded controller, in accordance with embodiments of the present disclosure.
Figure 2B:
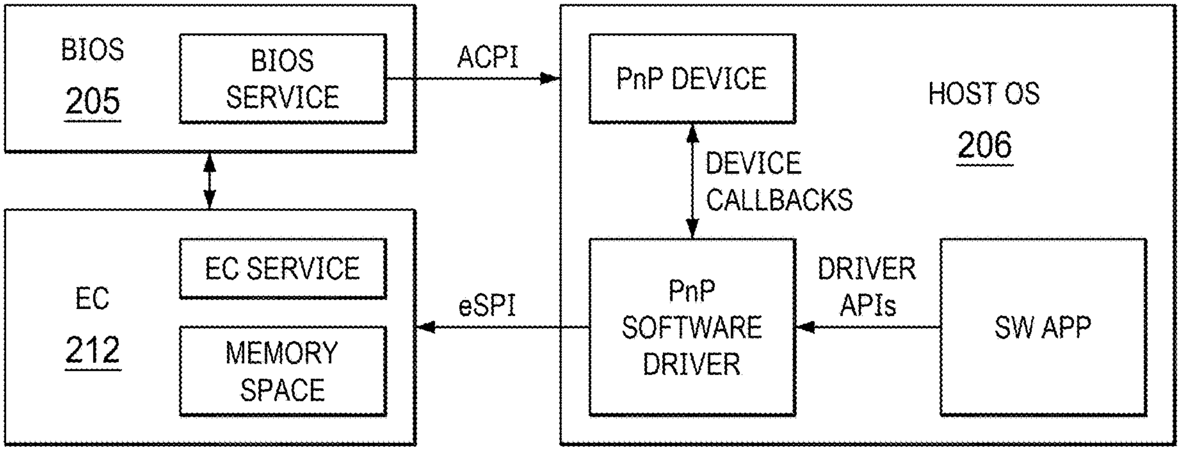
Figure 3:
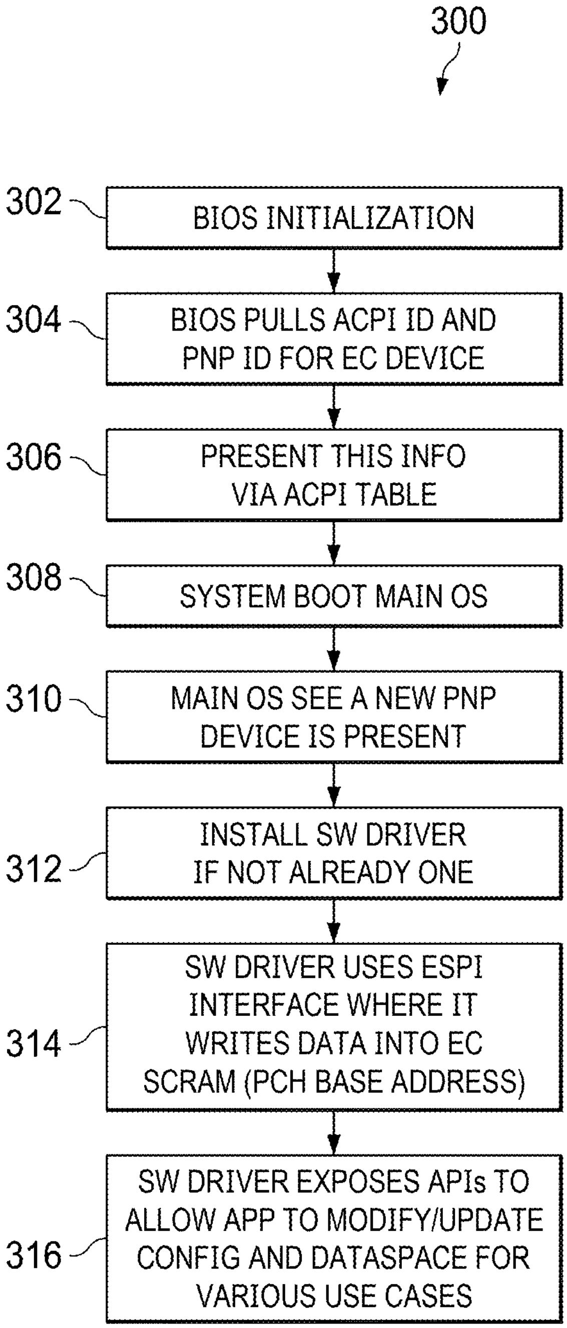
FIG. 3 illustrates an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments system 106 may be stored in storage media operating accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

In some embodiments, management controller 112 may be implemented as an embedded controller (EC). An EC may be implemented with a microcontroller, ASIC, or any other suitable processor in various embodiments. The EC may be configured to carry out various low-level system tasks for information handling system 102, as one of ordinary skill in the art with the benefit of this disclosure will appreciate. Although management controller 112 is shown as having its own network interface 118, an EC may not be equipped with such a network interface.

As discussed above, embodiments of this disclosure provide improved techniques for communication between operating system 106 of host system 98 and the EC. For example, communication between the EC and an EC driver running under the OS may be accomplished via a non-blocking I/O scheme such as memory-mapped I/O (MMIO) instead of via SMIs. The following discussion focuses on an embodiment in which MICROSOFT® WINDOWS® is used as the OS, but other OSes may also be supported using similar techniques.

In some embodiments, the EC may be presented to the host OS as a Plug and Play (PnP) device. As a PnP hardware device node in Device Manager, the EC will automatically raise an alert when it lacks the necessary driver, leveraging standard OS tools for locating and updating drivers. For example, when the OS detects the presence of the EC PnP device, it may search for a corresponding driver that is already installed. If no such driver is found, the OS may locate the correct driver on the Internet via its standard tools and install the driver.

In some embodiments, the EC may be presented as a PnP device upon every boot of the host system. In other embodiments, it may be presented as a PnP device only in response to certain trigger events. For example, such trigger events might include the first time the host system is powered on, the first time the host system boots into a newly installed OS, the host system recovering from a crash, the host OS undergoing a repair, etc.

On x86 platforms, the EC as a platform device may be physically connected to the processor/system-on-chip (SoC) via a specific hardware bus (e.g., Enhanced Serial Peripheral Interface (eSPI)). On ARM64 and certain other platforms, the EC may be connected to the PCH over an I2C bus. Some of the description herein focuses on x86 embodiments, but other platforms may also be supported using similar techniques.

The EC's eSPI block may be designed to support memory-mapped I/O and be directly memory addressable. The communication between the Platform Controller Hub (PCH) and the EC may be accomplished via the eSPI bus, which provides a 64 KB MMIO window. This large I/O mapping capability allows for the creation of multiple MMIO channels.

Code in the BIOS firmware may be configured to enable the EC to be enumerated and recognized as a hardware node platform device by the main OS. The BIOS may configure the physical MMIO interface between the EC and the PCH and assign the necessary ACPI and PnP IDs to the EC device as exposed through the ACPI table. This step ensures that the EC appears as a PnP device to the host OS during system initialization.

Additionally, a device driver (e.g., specific to the ECs of a given manufacturer) may be developed and registered with the host OS's automatic driver update functionality. This driver may then be responsible for interfacing with the EC, handling all of its OS runtime functionalities, and directly controlling the communications between the main OS and the EC.

Once the driver is registered, it may be automatically installed with the OS as part of the standard driver update process. This allows the OS to communicate with the EC and make use of its capabilities.

There is an existing industry registry of PnP IDs and ACPI IDs used in the _HID (Hardware ID), _CID (Compatibility ID), or _SUB (Subsystem ID) objects as described in the ACPI Specification for devices that do not have a standard enumeration mechanism. All such devices must contain an _HID (and possibly _CID and _SUB as well) in order to allow the OS to uniquely recognize the device so that it can load the appropriate driver software.

Each device manufacturer is responsible for assigning the PnP ID or ACPI ID for each of these components. The PnP ID and ACPI ID each consist of two parts: (1) a Vendor ID and (2) a product identifier. Each manufacturer of these devices must be assigned an industry-unique Vendor ID. The EC may also have the various other standard PnP device attributes (device class and subclass, device description, device serial number, device configuration, device interfaces, power management attributes, driver information, location information, etc.).

Accordingly, the manufacturer or vendor of the EC may write a PnP software driver to bind with the EC and become the primary I/O path into the EC from the OS context. The host device driver may implement a device callback for I/O operations to handle all the events and responses coming from the EC. The driver may use MMIO configured based on the PCH's eSPI base address that is advertised by the BIOS in the ACPI node. This is the EC MMIO access window where x86 I/O to the EC is optimized. This allows the driver to communicate with the EC and provide any MBOX-type functionality without requiring an SMI.

Accordingly, the EC is presented to the OS as a PnP device, and any application that needs to communicate with the EC is able to use device callbacks to do so. For example, the BIOS may create a PnP entry in the ACPI table configured to expose the EC as a PnP device to the host OS.

Turning now to FIGS. 2A and 2B, embodiments are shown in which a software application executing on host OS 206 needs to communicate with EC 212. In FIG. 2A, this is accomplished via an SMI to call into the BIOS runtime via Windows Management Instrumentation (WMI) and ACPI Source Language (ASL). In FIG. 2B, the communication is accomplished via a PnP software driver as described herein. In both FIG. 2A and FIG. 2B, the communication between BIOS 205 and EC 212 may be via MBOX or any other suitable messaging scheme.

In addition to being more efficient than SMI calls, the embodiment of FIG. 2B may provide many other advantages as well. For example, it may limit the exposed functionality and API of the EC to what is provided via the PnP interface and driver instead of allowing unrestricted access, as well as requiring elevated privileges to call sensitive EC APIs.

The EC may also by default treat all input from the PnP mechanism as untrusted, providing input validation and buffer overflow protection, and preventing physical memory attacks. The EC may execute payloads in a sandboxed process run at a low permission level in some embodiments.

Turning now to FIG. 3, a flowchart of an example method 300 is shown, in accordance with some embodiments.

At step 302, when the information handling system is turned on, the BIOS is initialized. At steps 304-306, the BIOS retrieves the ACPI ID and PnP ID for the EC and presents this info via the ACPI table.

At step 308, the host system boots to its main operating system. At step 310, the OS detects the EC as a new PnP device.

At step 312, a new driver for the EC is installed if necessary. The driver then uses the eSPI interface at step 314 to write data into the EC's address space via the PCH base address. The driver also exposes the EC's APIs at step 316 to allow software running under the OS to read and write data at the EC.

One of ordinary skill in the art with the benefit of this disclosure will understand that the preferred initialization point for the method depicted in FIG. 3 and the order of the steps comprising the method may depend on the implementation chosen. In these and other embodiments, the method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims all encompass changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:

at least one central processing unit (CPU);

a Basic Input/Output System (BIOS); and an embedded controller (EC);

wherein the information handling system is configured to:

execute an operating system (OS) via the at least one CPU;

execute an OS device driver for the EC, wherein the OS device driver is configured to provide non-blocking input/output (I/O) operations on the EC without the execution of a system management interrupt (SMI); and allow access to the EC from an application program via the OS device driver;

wherein the OS device driver is a Plug and Play (PnP) device driver, and wherein the BIOS is configured to present the EC as a PnP device to the OS in response to occurrence of a trigger event selected from the group consisting of: a first power-on of the information handling system, a first boot of the OS, a recovery of a crash associated with the OS, and a repair of the OS.

2. The information handling system of claim 1, wherein the BIOS is a Unified Extensible Firmware Interface (UEFI) BIOS.

3. The information handling system of claim 1, wherein the OS is configured to download the OS device driver via an automatic OS driver update mechanism.

4. The information handling system of claim 1, wherein the non-blocking I/O is memory mapped I/O (MMIO).

5. The information handling system of claim 1, wherein the EC is configured to return data to the application program via a device callback.

6. The information handling system of claim 1, wherein the EC is configured to provide keyboard processing, power management, and lighting control for the information handling system.

7. A method comprising:

an information handling system that includes a Basic Input/Output System (BIOS) executing an operating system (OS) via a central processing unit (CPU) thereof;

the information handling system executing an OS device driver for an embedded controller (EC) thereof, wherein the OS device driver is a Plug and Play (PnP) device driver that provides non-blocking input/output (I/O) operations on the EC without the execution of a system management interrupt (SMI);

the information handling system allowing access to the EC from an application program via the OS device driver;

the information handling system monitoring for a trigger event selected from the group consisting of: a first power-on of the information handling system, a first boot of the OS, a recovery of a crash associated with the OS, and a repair of the OS; the information handling system detecting the trigger event; and the BIOS presenting the EC as a PnP device to the OS upon detection of the trigger event.

8. The method of claim 7, wherein the BIOS is a Unified Extensible Firmware Interface (UEFI) BIOS.

9. The method of claim 7, wherein the OS downloads the OS device driver via an automatic OS driver update mechanism.

10. The method of claim 7, wherein the non-blocking I/O is memory mapped I/O (MMIO).

11. The method of claim 7, wherein the EC returns data to the application program via a device callback.

12. The method of claim 7, wherein the EC is configured to provide keyboard processing, power management, and lighting control for the information handling system.

13. An article of manufacture comprising a non-transitory, computer-readable medium having computer-executable instructions thereon that are executable by a processor of an information handling system that includes a Basic Input/Output System (BIOS) for:

executing an operating system (OS);

executing an OS device driver for an embedded controller (EC) of the information handling system, wherein the OS device driver is configured to provide non-blocking input/output (I/O) operations on the EC without the execution of a system management interrupt (SMI); and allowing access to the EC from an application program via the OS device driver;

wherein the OS device driver is a Plug and Play (PnP) device driver, and wherein the BIOS is configured to present the EC as a PnP device to the OS in response to occurrence of a trigger event selected from the group consisting of: a first power-on of the information handling system, a first boot of the OS, a recovery of a crash associated with the OS, and a repair of the OS.

14. The article of claim 13, wherein the BIOS is a Unified Extensible Firmware Interface (UEFI) BIOS.

15. The article of claim 13, wherein the OS is configured to download the OS device driver via an automatic OS driver update mechanism.

16. The article of claim 13, wherein the non-blocking I/O is memory mapped I/O (MMIO).

* * * * *